June 17, 1924.
L. SCHULL
SCREW PRESS
Original Filed Dec. 11, 1920
1,498,208
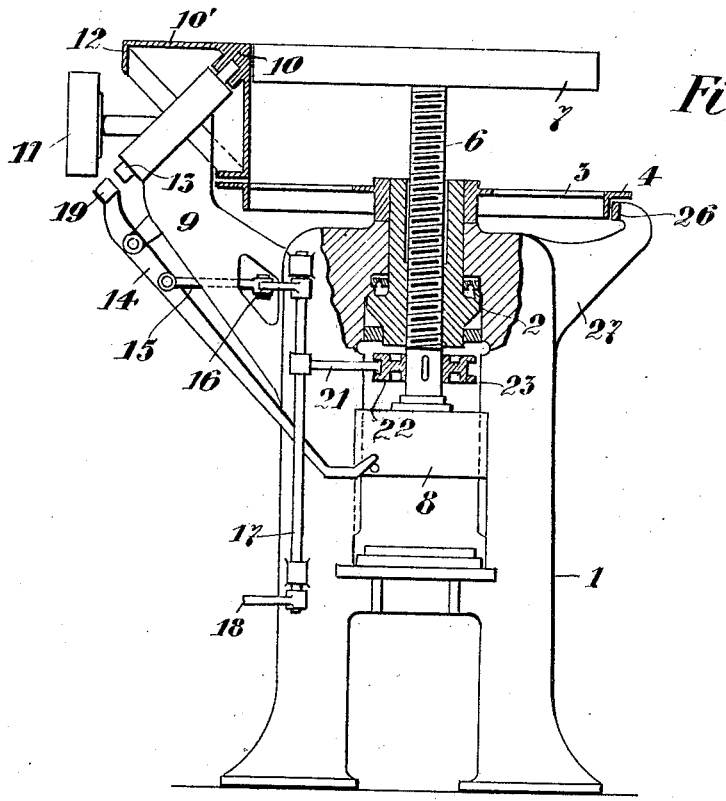
Fig.1.
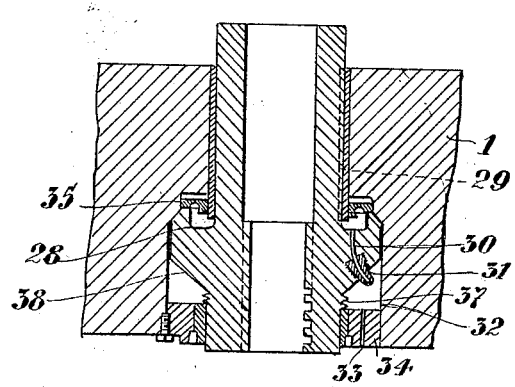
Fig.2.
Fig.3.
INVENTOR
Leopold Schull
by Mock & Blum Attorneys Patented June 17, 1924.

1,498,208

UNITED STATES PATENT OFFICE.

LEOPOLD SCHULL, OF VIENNA, AUSTRIA.

SCREW PRESS.

Application filed December 11, 1920, Serial No. 430,073. Renewed December 11, 1923.

*To all whom it may concern:*

Be it known that I, LEOPOLD SCHULL, a citizen of the Republic of Austria, and resident of 107 Dresdnerstrasse XX, Vienna, in the Province of Lower Austria and Republic of Austria, have invented certain new and useful Improvements in Screw Presses, of which the following is a specification.

This application corresponds to that filed by me in Austria on November 17th, 1919 (A-4253-19).

Screw-presses having a frictional drive and a fly-wheel connected with the moving parts of the press and which acts to store energy are well-known. It is also well-known to diminish the consumption of energy in such presses by disengaging the fly-wheel from the source of power during the ascent of the spindle of the press. In such constructions the spindle is raised by a screw-nut rotatably mounted in the standard of the press and provided therefore with a friction wheel. The downward movement or descent of the spindle has been hitherto usually effected by a fly wheel connected with the spindle and driven by means of a friction wheel, while a manually operated brake was provided to prevent the nut from rotation by braking the friction-wheel.

But it was not possible to prevent the nut from rotation by such a brake especially because it is practically impossible to always counteract the turning moment of the nut by a manually effected brake-pressure since this turning moment frequently increases extremely during the work. The object of this invention is to produce a brake pressure to prevent the screw-nut from rotation during the descent of the spindle by suitably shaping and mounting this screw-nut, the brake pressure automatically increasing and decreasing according to the work-resistance.

In the accompanying drawings several embodiments of the invention are illustrated. In said drawings Fig. 1 is a front view of the press partially in section, Fig. 2 is a sectional view of the revolubly mounted screw-nut, and Fig. 3 is a section of the oil cup.

The screw-nut 2 which is fixedly connected with a wheel 3 is revolubly mounted in the standard of the press. The upper face 4 of this wheel serves as frictional or rubbing surface.

The fly wheel 7 is rigidly connected with the upper end of the spindle 6, having the slide 8 at its lower end, this slide being guided in the standard 1.

On the standard is provided a projection 9 which contains the bearings for the friction bevel wheel 10 and the belt pulley 11. The friction bevel wheel 10 has two rubbing surfaces, the surface 10′ being adapted to drive the fly wheel 7, the other surface 12 being adapted to drive the wheel 3 fixed to the nut 2.

The shaft 13 of the friction wheel 10 is diagonally mounted and may be moved axially by a lever 14, so that the friction disc 10 can be engaged alternately with the fly wheel 7 or with the rubbing surface 4. The lever 14 is connected by means of a link 15 with a projection 16 of the reversing spindle 17, which is vertically mounted on the standard 1 and can be turned by the workman in one or the other direction by means of a lever 18.

When the descent of the spindle is to be effected the spindle 17 is turned so that the friction wheel 10 is pressed against the fly wheel 7 by the pressure which the projection 19 effects at the end of the shaft 13. By turning the spindle 17 in the opposite direction, the projection 19 of the lever 14 is moved away from member 13 and the friction wheel 10 slides downwardly because of its weight. Then the fly wheel 7 is released and the rubbing surface 12 of the friction disc 10 comes into engagement with the rubbing surface 4 of the wheel 3 causing the nut 2 to rotate. During its ascent the spindle is braked so as to prevent its revolution by a brake shoe 21 guided axially on the spindle 17, this brake shoe co-operating with a brake pulley 22 mounted on the spindle 6 and provided with flanges 23.

During that part of the descent of the spindle when it is idle the nut 2 is braked so as to prevent it from revolving therewith by pressure of the friction disc 10 against the fly wheel 7 transmitted to the disc 3 by the spindle 6 and the nut 2, which is mounted with but little clearance in the standard 1. The disc 3 is pressed against the brake shoe 26 disposed at the projection 27 of the standard 1. Instead of this brake device any other type can be used, as for instance a manually actuated brake.

To automatically prevent the nut from revolving during the blow or stroke of the press the conical frictional surface $k$ of the nut is pressed against its corresponding conical seat in the standard by the resistance of the work piece.

It will be understood, that the component of reaction pressing the nut against its seat is greater, if the seat is conical than if it is formed with a horizontal face and that this reaction increases according to the angle or inclination of the conical surface. It is obvious that other well-known devices could be employed as equivalent means for securing a firm engagement between the stationary seat and the nut when the nut is pressed upwardly by the reaction on the spindle when the press is operating on the work.

It is necessary to prevent the lubricating oil from running down from the oil grooves of the nut between the conical surface $k$ and the adjacent conical surface of the standard, which may be called its conical seat. If an oil is allowed to drip between the conical surface of the nut and its conical seat, this diminishes their frictional grip when they are pressed together, which is undesirable.

To prevent the oil from running between the conical friction surfaces the nut is provided with a ring-shaped drip cup 28 as shown in Fig. 2. In this drip cup the oil dropping down along the oil grooves 29 is gathered and thrown by the centrifugal force through the bore 30 and the oil pipes 31 against the wall 32 of the standard 1. From there it drops out through the cylindrical bore 33 of the neck ring 34. In order to prevent the oil from rising out of the drip cup 28 to its exterior edge and to the conical friction surfaces, an oil dip ring 35 overlapping the drip cup 28 (Fig. 3) is used. This oil dip-ring is provided with a downwardly and outwardly directed flange 36 from which the ascended lubricant is thrown back by the centrifugal force into the drip cup 28. Further the portion 37 of the nut 2 may be toothed, in order that the lubricant, ascending on it, is thrown away too by the centrifugal force, before it comes along the bevel face 38 to the friction surface K. The screw nut 2 is of high pitch.

When the bevel wheel 10 is in frictional engagement with fly wheel 7 to lower the spindle 6, said wheel 10 is out of engagement with the surface 4. The pressure of the slide 8 against the article to be worked out causes a reaction on the nut 2 so that its conical surface $k$ is pressed against its conical seat with sufficient force to lock the nut 2 and prevent it from revolving. Of course this reaction on nut 2 is equal to the pressure exerted upon the article worked upon, at all times, and is therefore always sufficient to prevent the revolution of said nut while the press is operating. While the spindle 6 is descending, and before the work is operated upon, the friction of disc 3 against its bearing, due to the weight of the fly-wheel 7, is sufficient to prevent it from revolving as before explained.

When the stroke of the press has been completed, the workman or operator, causes the movement of bevel wheel 10 so that it is disengaged from the fly-wheel and engages the frictional surface 4 of disc 3. The nut 2 is now revolved, and since the revolution of spindle 6 is sufficiently braked by brake shoe 21 to prevent its revolution during this the spindle is raised. By a conical friction surface, I mean to include all non-planar surfaces as equivalents.

Without limiting myself to the exact construction and arrangement of parts herein shown and described, what I claim, and desire to secure by Letters Patent, is:

1. In a spindle press, a threaded spindle, a nut engaging said spindle, said nut being held in a mount adapted to permit the revolution thereof and a slight movement thereof together with said spindle in a direction parallel to said spindle, means adapted to engage and hold said nut to prevent its revolution when the spindle is moved by the reaction against it when the press is being operated, and means for alternatively operating said nut and said spindle.

2. In a spindle press, the combination of a bearing, a nut revolubly mounted in said bearing and having an upper conical friction surface, a corresponding stationary conical seat located adjacent thereto and adapted to frictionally engage therewith, so that if said nut is pressed upwardly the revolution thereof is opposed by the friction of said friction surface and said seat, a threaded spindle passing through said nut and in engagement therewith, means for alternatively revolving said spindle and said nut, said bearing having a groove adapted to contain lubricating material, and means for preventing said lubricating material from reaching said conical surface.

3. In a spindle press, the combination of a bearing, a nut revolubly mounted in said bearing and having an upper conical friction surface, a corresponding stationary conical seat located adjacent thereto and adapted to frictionally engage therewith, so that if said nut is pressed upwardly the revolution thereof is opposed by the friction of said friction surface and said seat, a threaded spindle passing through said nut and in engagement therewith, means for alternatively revolving said spindle and said nut, said bearing having a groove adapted to contain lubricating material, and said nut having a retaining groove located below said conical surface and communicating with said first mentioned groove, so as to restrain the lubricating material from reaching said conical surface.

4. In a spindle press, the combination of a bearing, a nut revolubly mounted in said bearing and having an upper conical friction surface, a corresponding stationary conical seat located adjacent thereto and adapted to frictionally engage therewith, so that if said nut is pressed upwardly the revolution thereof is opposed by the friction of said friction surface and said seat, a threaded spindle passing through said nut and in engagement therewith, means for alternatively revolving said spindle and said nut, said bearing having a groove adapted to contain lubricating material, and said nut having a retaining groove located below said conical surface and communicating with said first mentioned groove, so as to restrain the lubricating material from reaching said conical surface, and means for leading the lubricating material out of said retaining groove.

5. In a spindle press, the combination of a bearing, a nut revolubly mounted in said bearing and having an upper conical friction surface, a corresponding stationary conical seat located adjacent thereto and adapted to frictionally engage therewith so that if said nut is pressed upwardly the revolution thereof is opposed by the friction of said friction surface and said seat, a threaded spindle passing through said nut and in engagement therewith, means for alternatively revolving said spindle and said nut, said bearing having a groove adapted to contain lubricating material, and said nut having a retaining groove located below said conical surface and communicating with said first mentioned groove, so as to restrain the lubricating material from reaching said conical surface, said nut having a flange adapted to close said retaining groove, said flange having a downwardly and outwardly inclined surface.

Signed at Vienna, Austria, this 16th day of November, A. D. 1920.

LEOPOLD SCHULL.